US00RE50057E

(19) United States
(12) Reissued Patent
Peng

(10) Patent Number: US RE50,057 E
(45) Date of Reissued Patent: Jul. 23, 2024

(54) SYNCHRONOUS LIGHT EMITTING DIODE LAMP STRING CONTROLLER

(71) Applicant: SEMISILICON TECHNOLOGY CORP., New Taipei (TW)

(72) Inventor: Jacky Peng, Jhonghe (TW)

(73) Assignee: SEMISILICON TECHNOLOGY CORP., Taipei County (TW)

(21) Appl. No.: 18/076,159

(22) Filed: Dec. 6, 2022

Related U.S. Patent Documents

Reissue of:
(64) Patent No.: 7,928,667
Issued: Apr. 19, 2011
Appl. No.: 11/984,697
Filed: Nov. 21, 2007

(30) Foreign Application Priority Data

Nov. 23, 2006 (TW) ..... 95220651 U
Apr. 11, 2007 (TW) ..... 96205745 U

(51) Int. Cl.
*H05B 45/345* (2020.01)
*H05B 45/30* (2020.01)

(52) U.S. Cl.
CPC ..... *H05B 45/345* (2020.01); *H05B 45/30* (2020.01)

(58) Field of Classification Search
CPC ..... H05B 45/345
See application file for complete search history.

(56) References Cited

U.S. PATENT DOCUMENTS 6,072,280 A * 6/2000 Allen ..... 315/185 S
6,777,891 B2 * 8/2004 Lys et al. ..... 315/291
7,250,730 B1 * 7/2007 Allen ..... 315/185 R
7,253,566 B2 * 8/2007 Lys et al. ..... F21S 4/10 315/291
7,508,141 B2 * 3/2009 Wong ..... H05B 47/155 315/185 S
2002/0171378 A1 * 11/2002 Morgan et al. ..... 315/291
2006/0267861 A1 * 11/2006 Yonezawa ..... 345/46
2022/0171378 A1 * 6/2022 Harkaway ..... B23K 9/0956

* cited by examiner

*Primary Examiner* — Angela M Lie
(74) *Attorney, Agent, or Firm* — Muncy, Geissler, Olds & Lowe, P.C.

(57) ABSTRACT

The present invention discloses a synchronous LED lamp string controller, comprising a clock synchronous circuit to receive a reference signal with a constant frequency, and based on which, to generate a system clock; a counter circuit to counter the system clock and generate a clock signal; a control logic circuit to receive said clock signal to generate a control signal; and a driver circuit to receive said control signal to drive at least a light emitting diode.

5 Claims, 21 Drawing Sheets

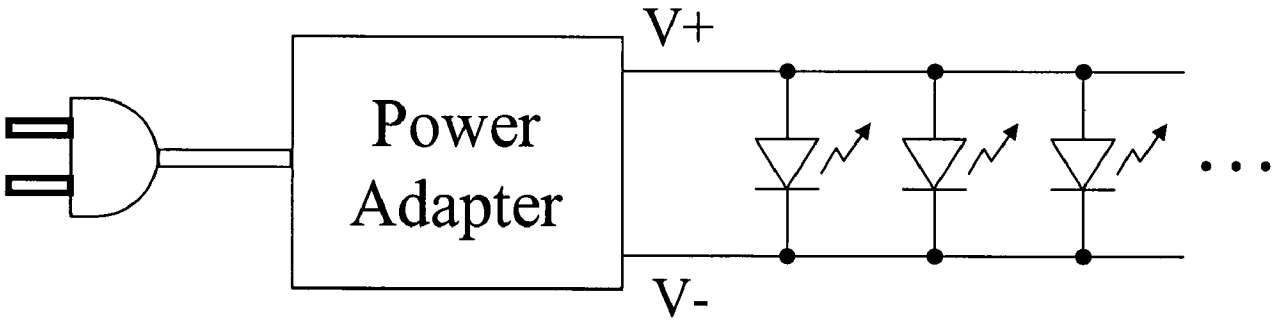
FIG. 20 *Prior Art*
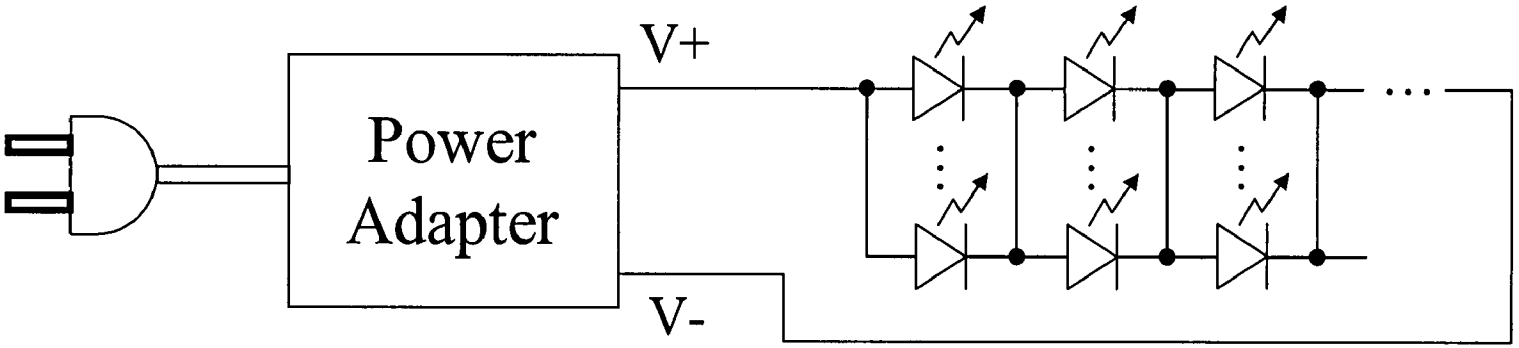
FIG. 21 *Prior Art*

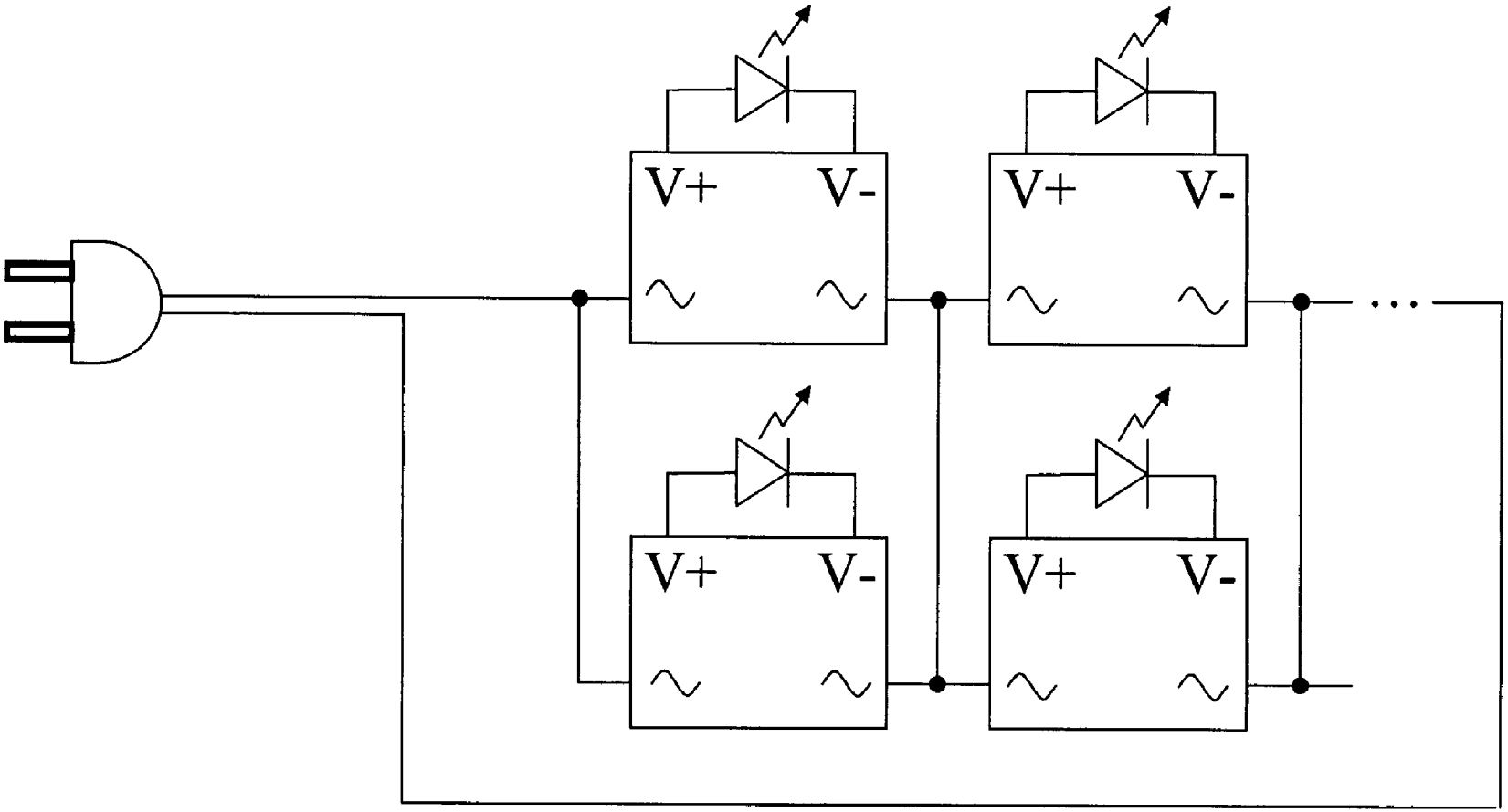
FIG. 22 *Prior Art*

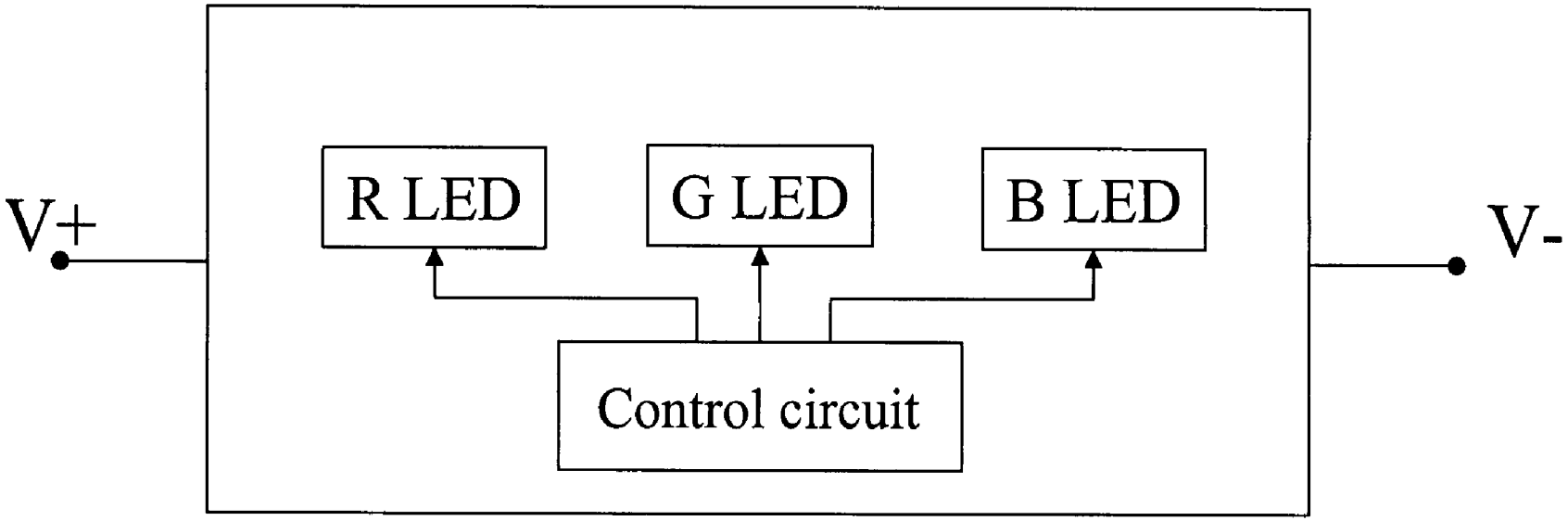
FIG. 23 *Prior Art*

SYNCHRONOUS LIGHT EMITTING DIODE LAMP STRING CONTROLLER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF THE INVENTION

1. Field of the Invention

The present invention relates to a LED lamp string controller, more particularly relates to a synchronous lamp string controller applied in the synchronization of a LED lamp string.

2. Description of the Related Art

Lamp string has been widely applied as used in, for example, Christmas lamp, landscape lamp, and building lamp. Along with the progress of light emitting diode (LED) process and lower prices of LED products, application of LED in lamp string has become a trend. While LED is basically suitable for DC power and lamp string is applied in the AC power environment, there have been some lamp string products that use LED in the market. However, how to achieve synchronous changing presents a challenge in the application of LED lamp string. The present invention has studied this subject and obtained solid result, thereby submitting the patent application.

Current LED lamp string employs prior art as shown in FIG. 20, FIG. 21 and FIG. 23, wherein each light emitting module represents a set of RGB (three-colored) LED module. In the prior art, the technique shown in FIG. 1 is the most undesirable, for the lamp employs DC parallel type where all LED modules are arranged in parallel, which consumes greater current. That is, in order to supply greater current, the power adapter is structurally more complicated, or is more costly. The number of LED modules that can be parallelly arranged is also limited.

The technique shown in FIG. 21 is better than the technique shown in FIG. 1. Because the LED module is serially connected, the current consumption is smaller. As such, the power adapter is easily handled and hence costs less. But this technique still has a drawback, that is, the number of LED modules that can be serially connected is limited, subject to the DC voltage supplied by the power adapter, i.e. the higher the DC voltage, the more LED modules can be in series connection.

The technique shown in FIG. 22 is the best method among the three, in which the power adapter shown in FIG. 21 is replaced by a plurality of small power adapters, which are structurally relatively simple. In addition, there is no limit to the number of lamp units that can be connected. The only drawback is that because each LED module needs to be coupled with a small power adapter, the product cost tends to be higher.

In the prior art shown in FIG. 20, FIG. 21 and FIG. 22, a conventional LED module includes a red light emitting diode (R LED), a green light emitting diode (G LED), a blue light emitting diode (B LED) and a control circuit, as shown in FIG. 23. Two pins of the conventional LED module are connected externally to the positive and negative terminals of the DC power, respectively. The control circuit can be realized as an integrated circuit (IC), which is used to drive the three primary-colors RGB LED or mix the colors according to the procedure configured in the original circuit. However, the drawback of the conventional LED module is that they are embedded with discrete control ICs. As such, when the LED modules are used in a lamp string, the color changing of each LED module after power on is independently operated without synchronization. If each LED module is arranged with a controller and the controllers are synchronized, the effect shown by the lamp string will be quite different from the star-studded effect achieved by discrete LED modules. Thus, how to control product cost while achieving synchronization effect provides a direction for research and development.

SUMMARY OF THE INVENTION

The object of the invention is to provide a synchronous LED lamp string controller where the controller receives a synchronous signal to facilitate the synchronous control of LED lamp string so as to achieve the synchronous display by the LED lamp string.

To achieve the aforesaid object, the invention provides a synchronous LED lamp string controller, comprising a clock synchronous circuit to receive a reference signal with a constant frequency, and based on which, to generate a system clock; a counter circuit to counter the system clock and generate a clock signal; a control logic circuit to receive said clock signal to generate a control signal; and a driver circuit to receive said control signal to drive at least a light emitting diode.

To achieve the aforesaid object, the invention further provides a synchronous LED lamp string controller, comprising a recognition circuit for receiving a reference signal with a constant frequency to carry out level shift and voltage biasing, and to output a recognition signal; a level register for receiving and storing the recognition signal; an encoder circuit for receiving data stored by the level register, and encoding and outputting the data; a register for receiving and storing the complete data stored in the shift register; and a driver circuit for receiving the data stored in the register to drive at least a light emitting diode.

To achieve the aforesaid object, the present invention further provides a synchronous LED lamp string controller, comprising a first control logic circuit coupled with a data input pin; and a second control logic circuit coupled with a data output pin; wherein the data input pin and the data output pin represent data logic H, data logic L and data logic M at predefined level and transmit the same clock transmission data.

To achieve the aforesaid object, the present invention further provides a synchronous LED lamp string controller, comprising a first control logic circuit coupled with a data input pin; and a second control logic circuit coupled with a data output pin; wherein the data input pin and the data output pin transmit data logic H signal, data logic L signal and clock signal at predetermined intervals.

The synchronous LED lamp string controller of the invention is a simple structure that uses a reference signal with a constant frequency to achieve the synchronous control of LED lamp string.

The object and features of the invention are described in detail with accompanying drawings below. The accompanying drawings and examples cited below are for illustration only and not meant to limit the actual application of the invention.

BRIEF DESCRIPTION OF THE DRAWINGS

FIG. 20 is a circuit block diagram of a convention LED lamp string;

FIG. 21 is another circuit block diagram of a conventional LED lamp string;

FIG. 22 is another circuit block diagram of a conventional LED lamp string; and FIG. 23 is a circuit block diagram of a conventional LED module.

DETAILED DESCRIPTION OF THE INVENTION

The present invention relates to a synchronous LED lamp string controller using a controller to receive a synchronous signal to achieve the synchronous control of LED lamp string.

Figure 1A:
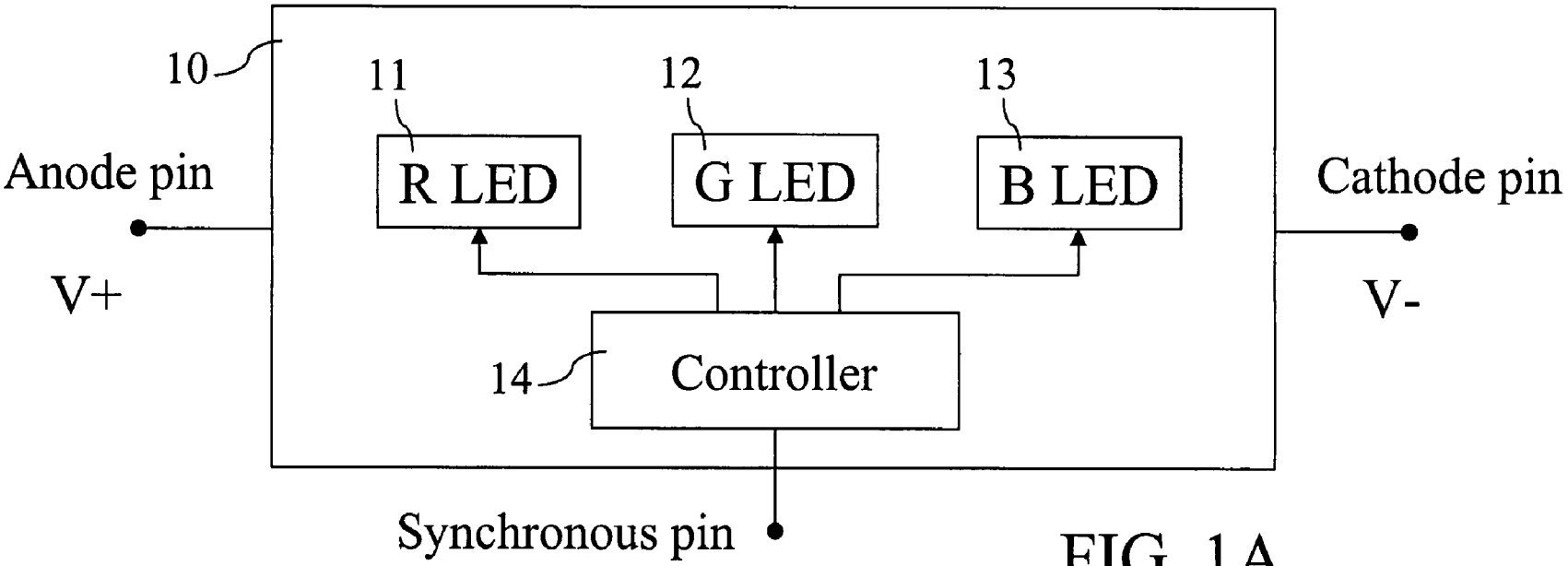
FIG. 1A is a block diagram of a three-pin LED module according to a preferred embodiment of the invention.

FIG. 1A is a block diagram of a three-pin LED module according to a preferred embodiment of the invention. The controller 14 of the invention is configured in a LED module 10, and LED module 10 further comprises a red light emitting diode (R LED) 11, a green light emitting diode (G LED) 12, a blue light emitting diode (B LED) 13 to provide the display of different colors. The controller 14 can be an integrated circuit preset with a procedure to drive the color changing sequence or flashing mode of R LED 11, G LED 12, and B LED 13.

According to the preferred embodiment of the invention, the LED module has three pins which are respectively an anode pin V+, a cathode pin V−, and a synchronous pin. The anode pin and the cathode pin receive a DC working voltage supplied to the LED module 10. The synchronous pin is connected to the controller 14. In varying embodiments below, the controller 14 outputs a reference signal (or synchronous signal SYNC) with a constant frequency at the synchronous pin or receives a reference signal (or synchronous signal SYNC) with a constant frequency at the synchronous pin, and based on said reference signal (or synchronous signal SYNC), controls the color changing sequence or flashing mode of R LED 11, G LED 12, and B LED 13.

Figure 1B:
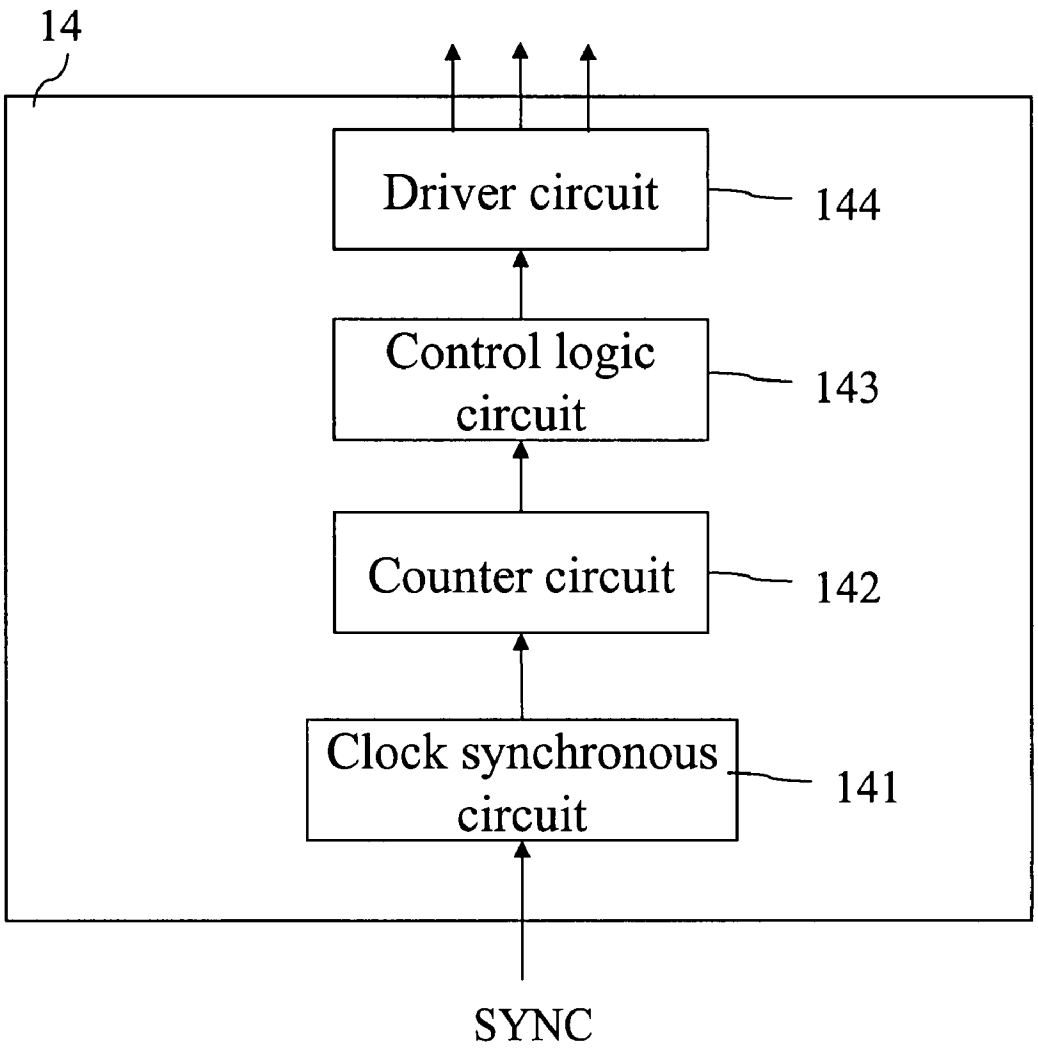
FIG. 1B is a functional diagram of the controller in FIG. 1A.

FIG. 1B is a functional diagram of controller 14 in FIG. 1A. The controller 14 further comprises a clock synchronous circuit 141, a counter circuit 142, a control logic circuit 143, and a driver circuit 144. The clock synchronous circuit 141 receives an external synchronous signal and synchronizing the synchronous signal with its internal frequency to prevent signal error and use the processed signal as the clock source for internal circuits. The counter circuit 142 counts the processed signal from the clock synchronous circuit 141 to generate the internal clock for the controller 14. The control logic circuit 143 processes the clock signal generated by the counter circuit 142 and generates a control signal for the user. The driver circuit 144 uses the control signal generated by the control logic circuit 143 coupled with constant-current control or current amplification to directly drive the light emitting diode and enable it to change its display.

In this preferred embodiment of the invention, the controller 14 can also be realized in a single-color LED lamp (not shown in the figure). The single-color LED lamp comprises at least a single-color light emitting diode, the single-color light emitting diode being a R LED, G LED or B LED and having three pins, which are respectively an anode pin, a cathode pin and a synchronous pin. The anode pin and the cathode pin receive a DC working voltage, whereas the synchronous pin is connected to the controller 14. Similarly in a different embodiment, the controller 14 outputs a reference signal (or synchronous signal SYNC) with a constant frequency at the synchronous pin or receives a reference signal (or synchronous signal SYNC) at the synchronous pin, and based on said reference signal (or synchronous signal SYNC), controls the light emitting frequency of the single-color light emitting diode.

Figure 2:
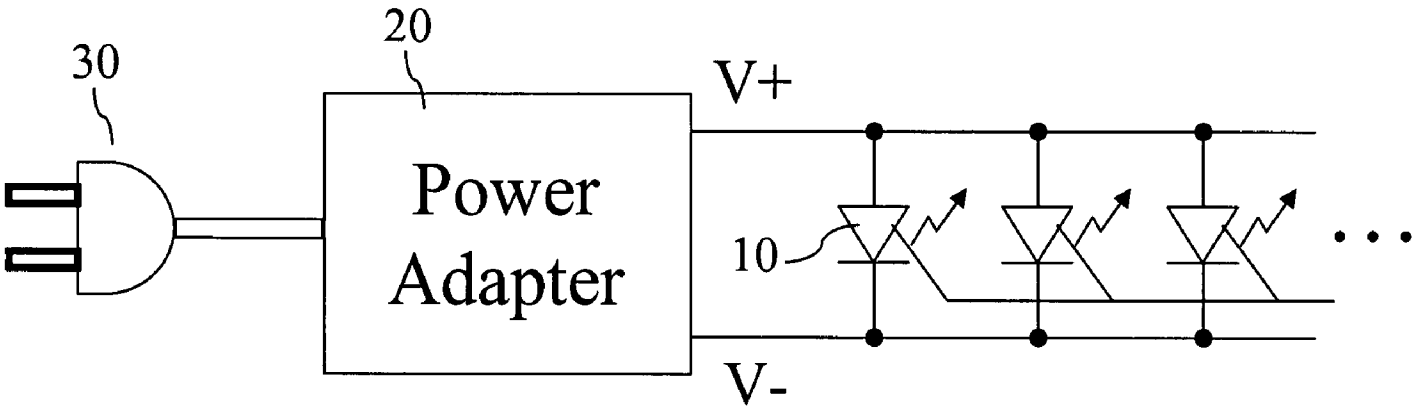
FIG. 2 is a circuit block diagram of the three-pin LED module string in parallel connection.
Figure 3:
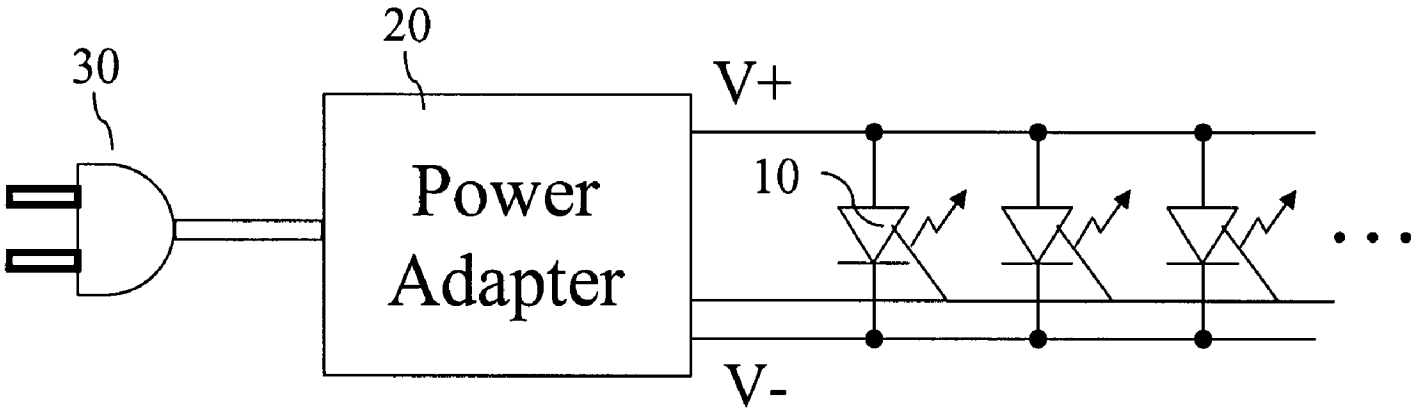
FIG. 3 is another circuit block diagram of the three-pin LED module string in parallel connection.

FIG. 2 and FIG. 3 are circuit block diagrams of the invention implemented in parallelly connected LED modules 10. As shown, a synchronous LED lamp string comprises a power adapter 20 and a plurality of LED modules 10. The power adapter 20 rectifies a AC power 30 and provides a DC voltage to drive the synchronous LED lamp string composed of a plurality of LED modules connected in parallel.

In the synchronous LED lamp string, the plurality of LED modules 10 are parallelly connected. As the output of the controller 14 for each LED module has the same potential, if the same synchronous signal SYNC is input into each controller 14, each controller 14 can act based on this same synchronous signal SYNC. The synchronous LED lamp string can also use power adapter 20 to transmit a synchronous signal SYNC with a single clock to enable the controllers 14 of all LED modules 10 to receive the same synchronous signal SYNC, thereby achieving synchronization in a simple fashion.

Figure 4:
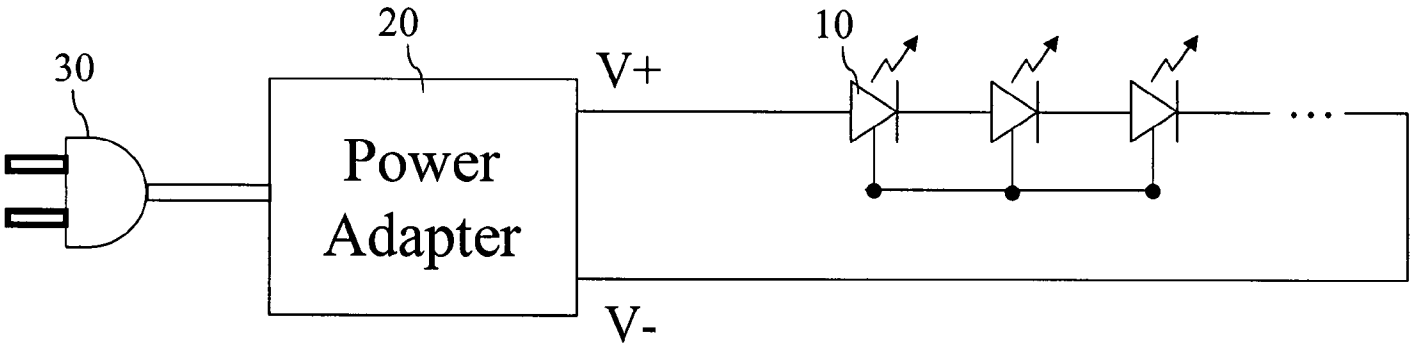
FIG. 4 is a circuit block diagram of the three-pin LED module string in series connection.
Figure 5:
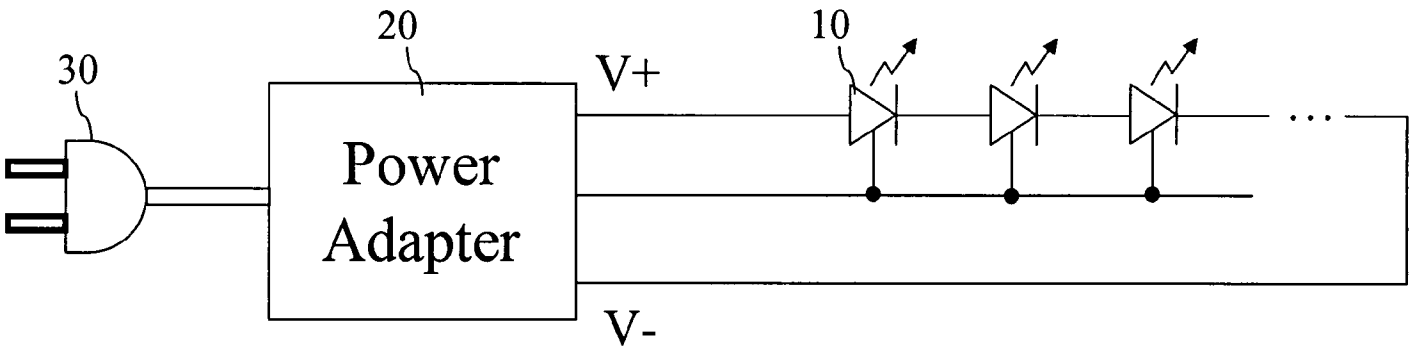
FIG. 5 is another circuit block diagram of the three-pin LED module string in series connection.

FIG. 4 and FIG. 5 are circuit block diagrams of the invention implemented in serially connected LED modules 10. As shown, a synchronous LED lamp string comprises a power adapter 20 and a plurality of LED modules 10. The power adapter 20 rectifies a AC power 30 and provides a DC voltage to drive the synchronous LED lamp string composed of a plurality of LED modules connected in series.

In the synchronous LED lamp string, the plurality of LED modules 10 are serially connected, which presents more difficulty in manufacturing but effectively reduces the power consumption. As shown in FIG. 4 and FIG. 5, the cathode pin of a previous level LED module 10 is connected to the anode pin of the next-level LED module 10. Thus the potential of the LED module 10 at each level is not equal. Thus when the reference signal (or synchronous signal SYNC) with a constant frequency is transmitted to the synchronous pin of LED module 10 at the next-level, its controller 14 cannot recognize the signal. Thus it is necessary to design a voltage shift of signal level between the synchronous pins of LED modules at two adjacent levels.

Figure 6:
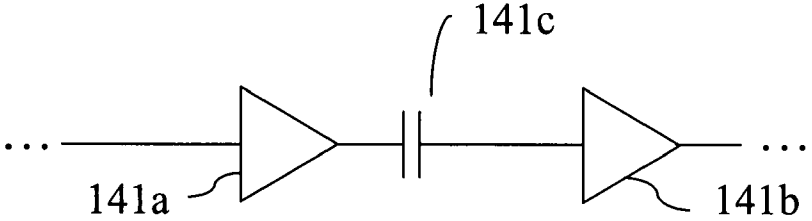
FIG. 6 is a block diagram of level shift circuit in the embodiment shown in FIG. 4 and FIG. 5.

FIG. 6 is a block diagram of level shift circuit in the embodiment shown in FIG. 4 and FIG. 5. As shown, the output buffer 141a and the input buffer 141b of between the synchronous pins of two adjacent levels are connected by a capacitor 141c, wherein the capacitor 141c filters the DC signal and retains the AC signal. As such, the synchronous pin of LED module 40 at each level can obtain a reference signal (or synchronous signal) with the same frequency source to achieve synchronized operation for the lamp string.

Figure 7:
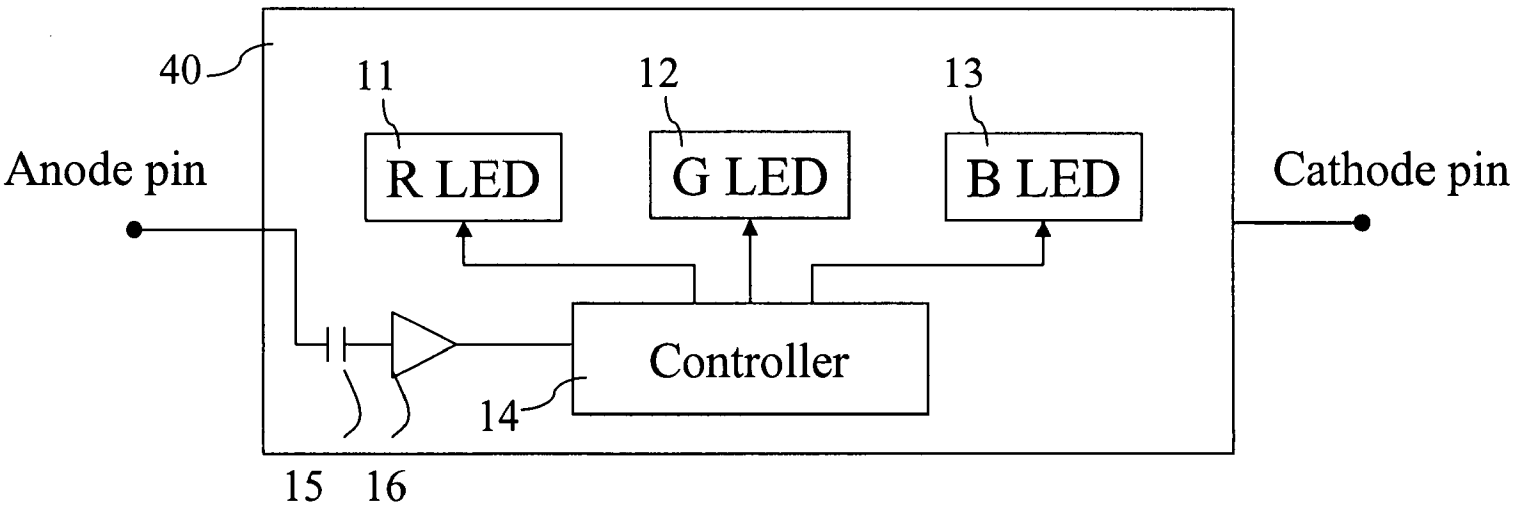
FIG. 7 is a block diagram of a two-pin LED module according to another embodiment of the invention.

FIG. 7 is a block diagram of a two-pin LED module according to another embodiment of the invention. The controller 14 of the invention is configured in a LED module 10, and LED module 10 comprises a red light emitting diode (R LED) 11, a green light emitting diode (G LED) 12, and a blue light emitting diode (B LED) 13 to provide the display of different colors. The LED module 10 further contains a capacitor 15 and a signal magnifying circuit 16. The controller 14 can be an integrated circuit preset with a procedure to drive the color changing sequence or flashing mode of R LED 11, G LED 12, and B LED 13.

According to this preferred embodiment of the invention, the LED module 10 has two pins which are respectively an anode pin V+ and a cathode pin V−. The anode pin and the cathode pin receive a DC working voltage supplied to the LED module 10. In this embodiment, LED module 40 demodulates the carrier signal from the DC voltage received at the anode pin to achieve the purpose of synchronous control. As such, the controller 14 outputs a reference signal (or synchronous signal SYNC) with a constant frequency at the synchronous pin or receives a reference signal (or synchronous signal SYNC) with a constant frequency at the synchronous pin, and based on said reference signal (or synchronous signal SYNC), controls the color changing sequence or flashing mode of R LED 11, G LED 12, and B LED 13.

Figure 8:
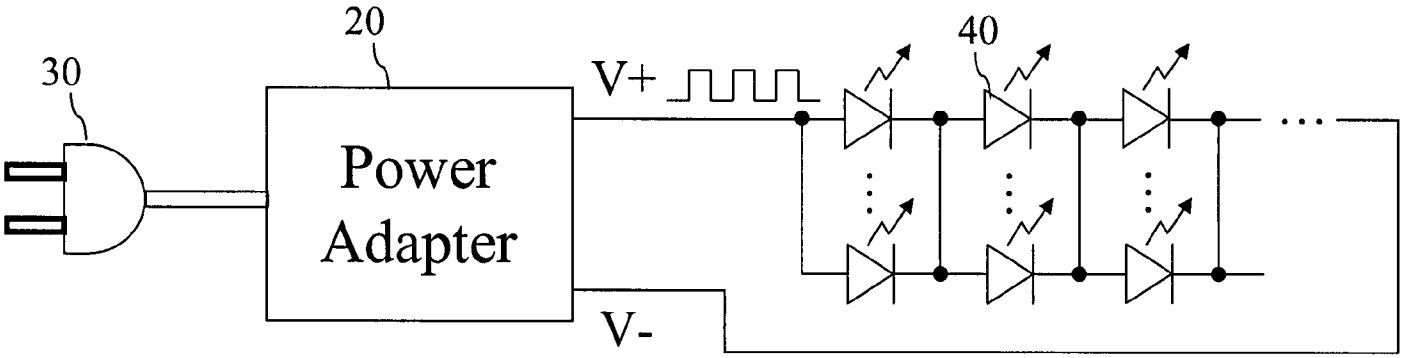
FIG. 8 is a circuit block diagram of the two-pin LED module string in series connection.
Figure 9:
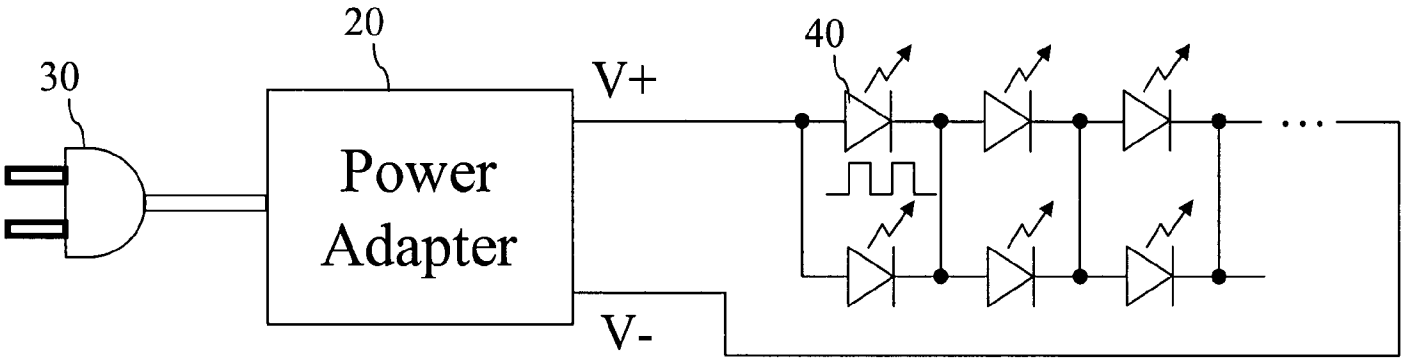
FIG. 9 is another circuit block diagram of the two-pin LED module string in series connection.
Figure 10:
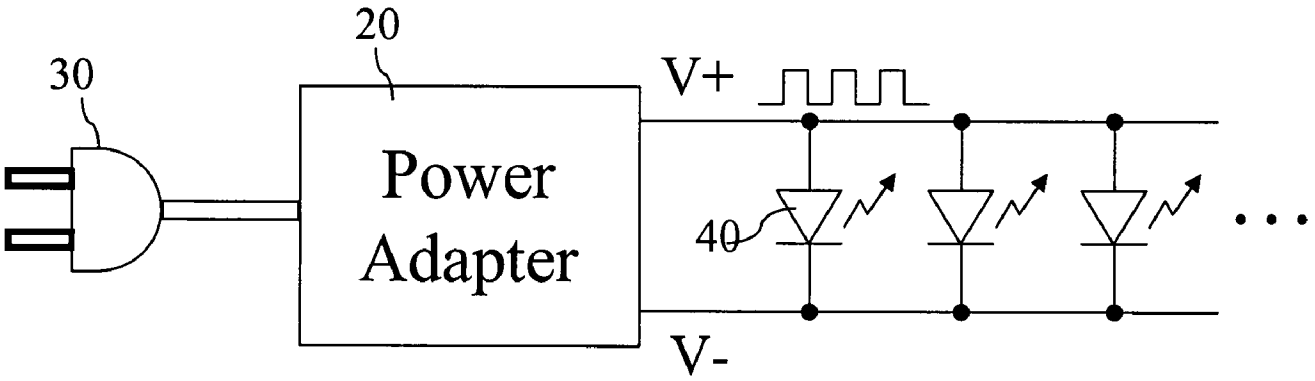
FIG. 10 is a circuit block diagram of the two-pin LED module string in parallel connection.

FIG. 8, FIG. 9 and FIG. 10 are circuit block diagrams of LED module 40 applied in a synchronous LED lamp string. In the embodiment, the power adapter 20 rectifies an AC power 30 and provides a DC voltage to drive a LED lamp string composed of a plurality of LED modules 40. The reference signal output by the power adapter 20 is a carrier signal with a constant frequency on the DC voltage. Respective LED module 40 employs capacitor 15 coupled with the signal amplifying circuit 16 to filter the DC value of carrier signal, while retaining the AC value such that the carrier signal can be demodulated from the inputted DC voltage to achieve the purpose of synchronous control. The controller 14 of the LED module 40 not only has the function of demodulating the carrier signal, it can also carry the carrier signal on the DC voltage to output to the next-level LED module 40, so that the controller 14 of the next-level LED module 40 can obtain the same carrier signal for synchronous control.

Figure 11:
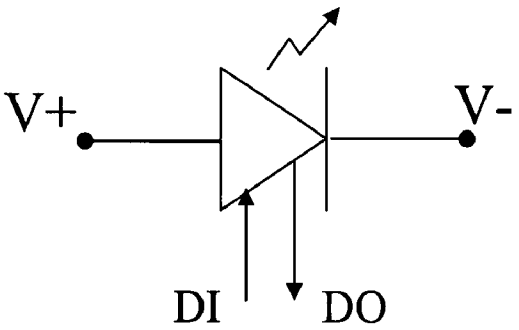
FIG. 11 shows the configuration of a four-pin LED module according to another embodiment of the invention.

FIG. 11 shows the configuration of a four-pin LED module according to another embodiment of the invention. The LED module 50 comprises an anode pin V+, a cathode pin V−, an input pin DI and an output pin DO. The anode pin and cathode pin receive a DC voltage. The input pin DI receives a signal, while the output pin DO outputs a signal.

Figure 12A:
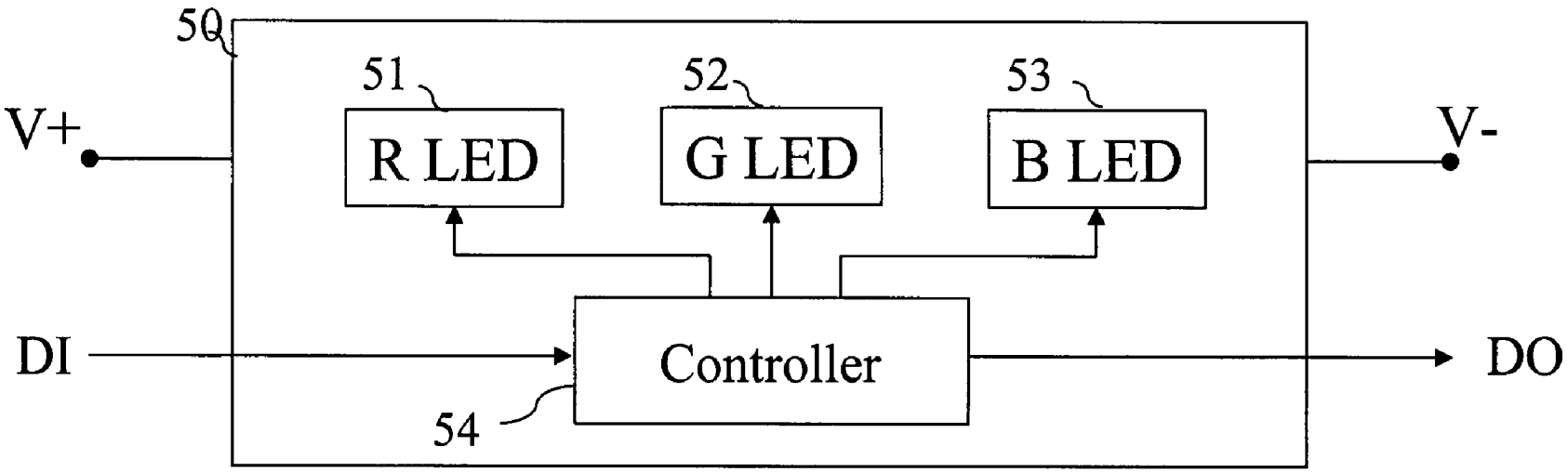
FIG. 12A is a block diagram of the LED module shown in FIG. 11.

FIG. 12A is a block diagram of the LED module shown in FIG. 11. In this embodiment, a LED module 50 according to the invention comprises a red light emitting diode (R LED) 51, a green light emitting diode (G LED) 52, a blue light emitting diode (B LED) 53, and a controller 54. The controller 54 can be realized as an integrated circuit and drives the color changing sequence or flashing mode of R LED 51, G LED 52, and B LED 53 based on the signal input from input pin DI, or outputs the command or data from input pin DI via the output pin DO. The signal transmitted by the input in DI and output pin DO can be a synchronous signal in the form of a simple clock signal or a regular data signal.

Figure 12B:
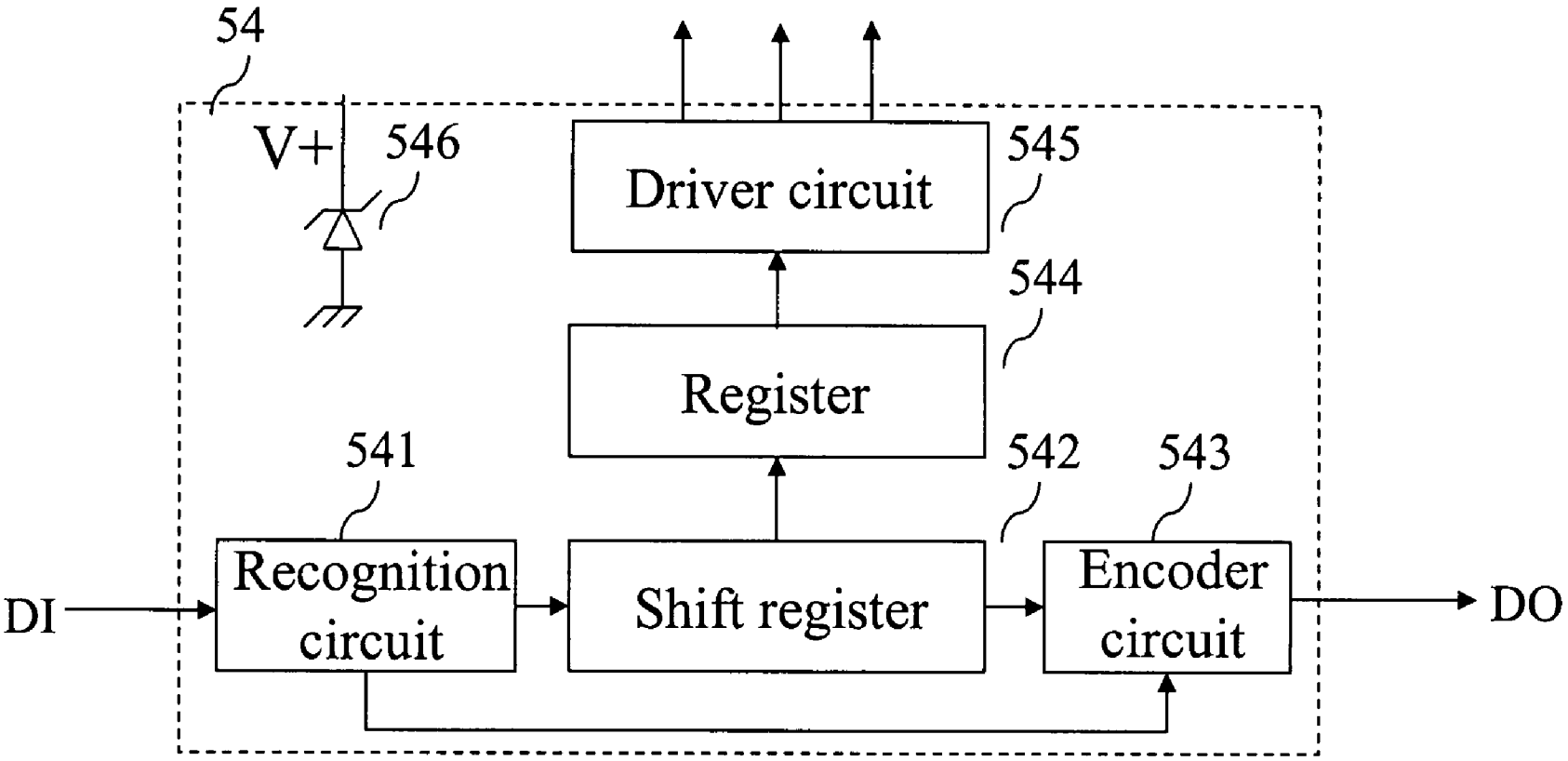
FIG. 12B is a functional diagram of the controller in FIG. 12A.

FIG. 12B is a functional diagram of the controller in FIG. 12A. The controller 54 further comprises a recognition circuit 541, a shift register 542, an encoder circuit 543, a register 544, a driver circuit 545 and a Zener diode 546. The recognition circuit 541 receives the signal of input pin DI for recognition; the shift register 542 receives the data transmitted from the recognition circuit 541; the register 544 receives the complete data stored in the shift register 542; the driver circuit 542 drives the color changing sequence or flashing mode of R LED 51, G LED 52, and B LED 53 based on the complete data in register 544; and the encoder circuit 543 receives the command of the recognition circuit 542 to determine to encode the complete data from shift register 542 and output the data to output pin DO; wherein the recognition circuit 541 determines whether the data received by the input pin DI is a command from the LED module 50, or to re-encode the data where the data are output by the output pin DO to the next-level LED module 50.

The controller 54 of LED module clamps the inputted working voltage within a fixed range through a voltage clamping element to prevent damage to the controller 54 or the LED module 50 due to excess voltage inputted.

Figure 12C:
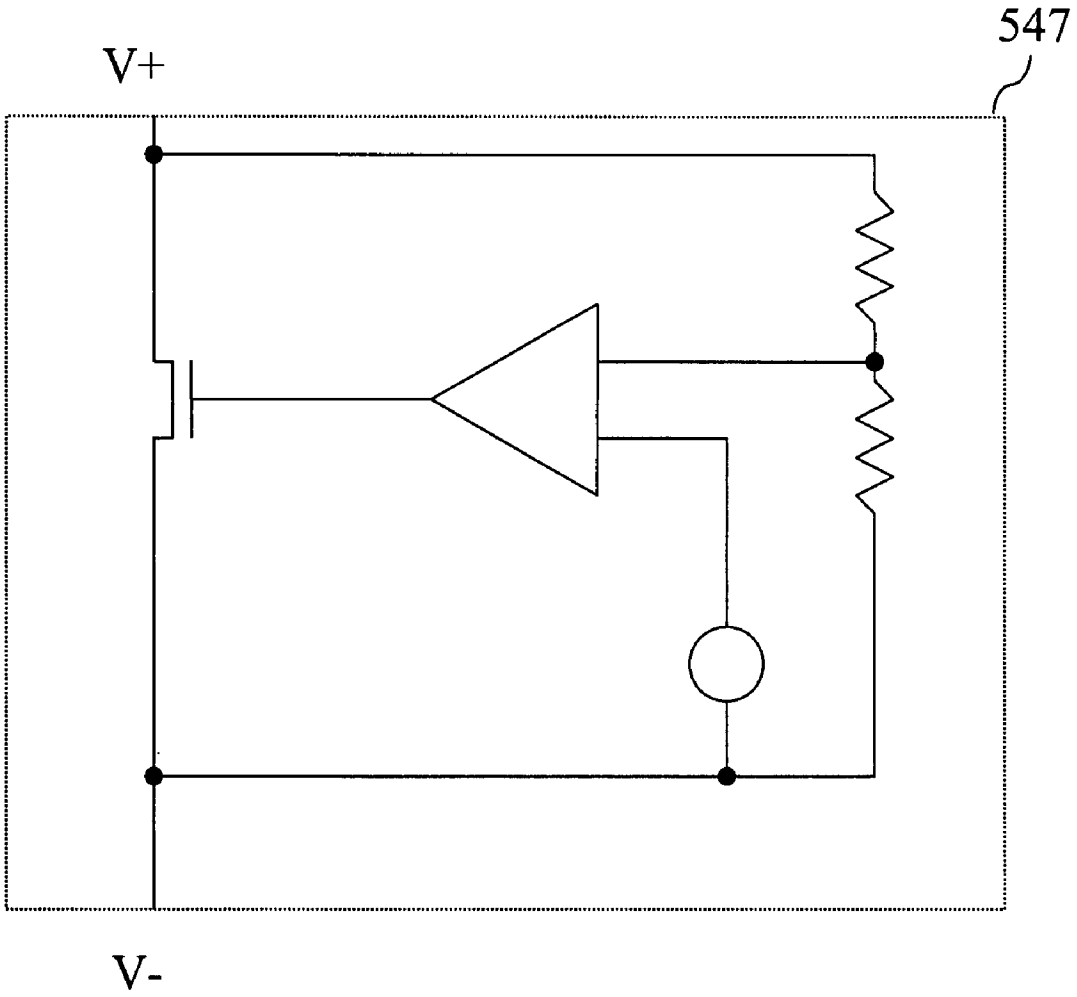
FIG. 12C is a circuit block diagram of a voltage clamping element in another embodiment of the invention.

In an embodiment, the controller 54 contains a Zener diode 546 as shown in FIG. 12B to confine the working voltage applied to each controller 54 to a fixed range to prevent the burning of controller 54 or LED module 50 caused by excess voltage. Referring to FIG. 12C, the voltage clamping element of the invention can further be a voltage clamp circuit 547 to keep the voltage drop from anode pin V+ to cathode pin V− within a fixed range to protect the controller 54.

Figure 13:
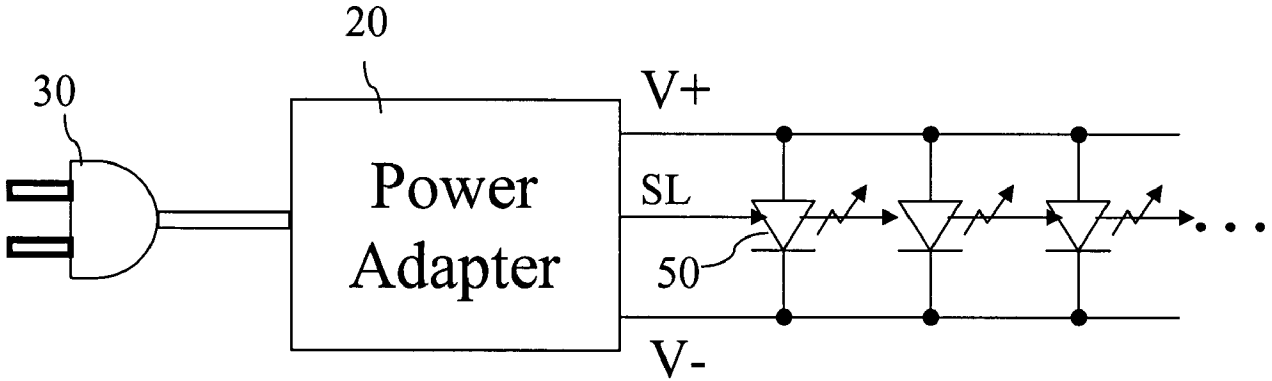
FIG. 13 is a circuit block diagram of the four-pin LED module string in parallel connection.
Figure 14:
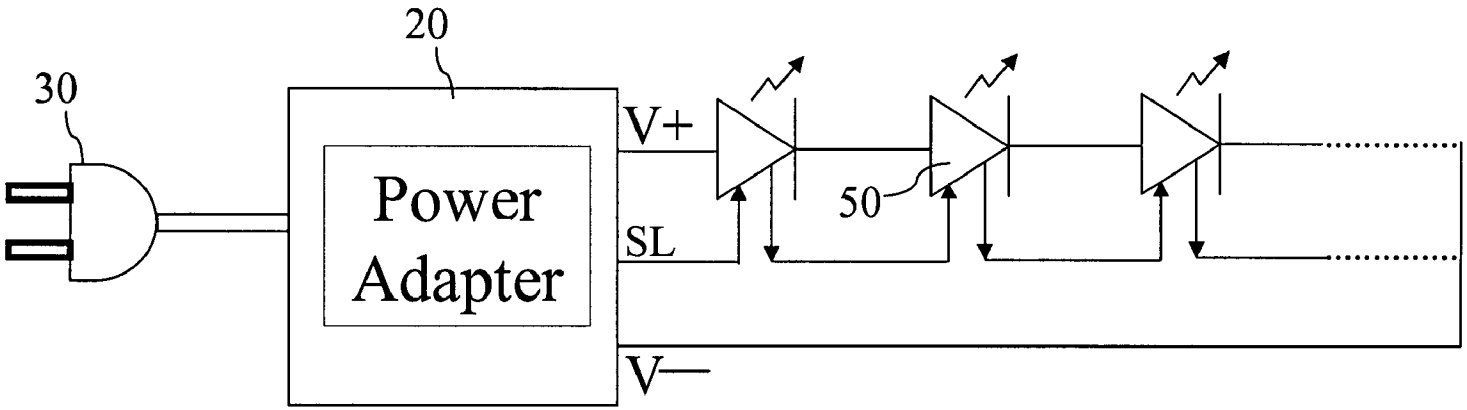
FIG. 14 is a circuit block diagram of the four-pin LED module string in series connection.

FIG. 13 and FIG. 14 are circuit block diagrams of LED module 50 applied in a synchronous light emitting diode (LED) lamp string. As shown in the circuit block diagram in FIG. 13, the synchronous LED lamp string comprises a plurality of LED modules 50 connected in parallel, and between two adjacent LED modules, the output pins DO of the previous-level LED modules 50 are simultaneously connected to the input pins DI of the next-level LED modules 50. In this embodiment, the power adapter 20 that supplies DC power to the synchronous LED lamp string has data processing ability and outputs a command via a signal line SL to the input pin DI of the first LED module 50 to control the color changing sequence or flashing mode of the synchronous LED lamp string.

The power adapter 20 can be built in with a microprocessor or a data processor and a memory for storing the designed pattern or effect of the synchronous LED lamp string, such as the running-lamp effect or a pursuing-lamp effect. The lamp string can also display a particular pattern. Once the power adapter 20 is connected to the AC power 30, the microprocessor or the data processor captures the data stored in the memory and transmits different signals including data, clock signals, and simultaneous display in a specific data format via a signal line SL.

Figure 15A:
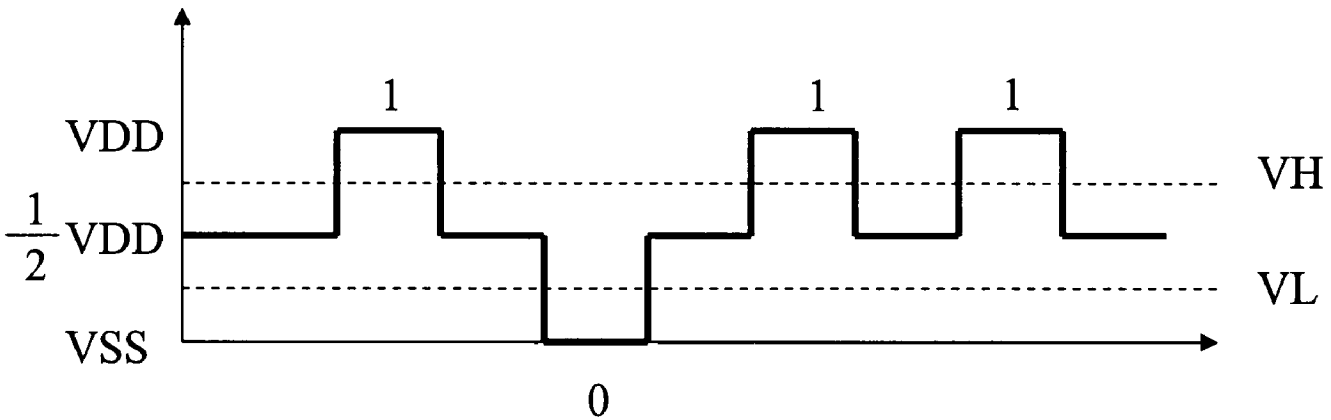
FIG. 15A and FIG. 15B is a signal transmission diagram of the four-pin LED module.
Figure 15B:
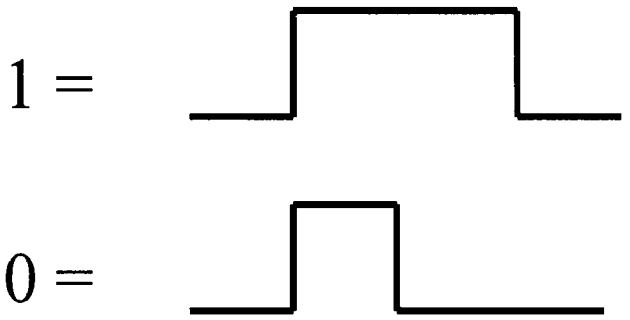

FIG. 15A and FIG. 15B are signal diagrams of LED module 50. There are two data transmission methods as described blow. One method employs voltage level and clock as shown in FIG. 15A. Before the power adapter 20 starts to transmit data, the signal line SL is in a data-free state, which is represented by a voltage level of ½ VDD. When the power adapter 20 starts to transmit the data, digital signal "1" or "0" represents a command executed by each LED module 50. The action to be executed can be predefined, wherein digital signal "1" represents high voltage level VDD, while digital signal "0" represents low voltage level VSS. In the process of data transmission, when the transmission of each bit "1" or "0" is over, the signal line SL returns to the voltage level of ½ VDD, and then transmits the next bit. As such, data and clock can be simultaneously transmitted. The controller 54 of each LED module 50 receives and processes the data after recognition by recognition circuit 541, then encodes the data via encoder circuit 543 into identical signal format before transmitting the signal to the next-level LED module 50. Each synchronous LED lamp string will pre-define the total number of LED module 50. When it is necessary to change brightness, the microprocessor or data processor transmits bit number equal to the total number of the LED modules 50. As such, each bit is properly transmitted to each LED module 50.

After the data transmission is over, the output pin DO of the power adapter and the output pin DO of the LED module 50 stay at the voltage level of ½ VDD. In this embodiment, the present invention can define that if the duration of output pin DO at voltage level of ½ VDD exceeds a certain period of time, the data is locked and displayed. Hence, the synchronous LED lamp string can have flashing or display variations by changing the memory only. The synchronous LED lamp string in this embodiment recognizes data in a static manner and offers better design flexibility.

Another data transmission method which encodes the data is as shown in FIG. 15B, The data and clock are transmitted in forms of digital signals "1" and "0" which have predefined time intervals. Similarly, it can be defined that the signal line stays in a voltage level of VDD or VSS when there is no signal transmitted through the signal line. When the signal line staying in the voltage level exceeds a certain period of time, it means command lock-in and change is displayed. As such, it also enables the power adapter 20 to transmit data, clocks and simultaneous display via an output pin DO. The synchronous LED lamp string requires each LED module 50 to generate a clock for data recognition.

Figure 16:
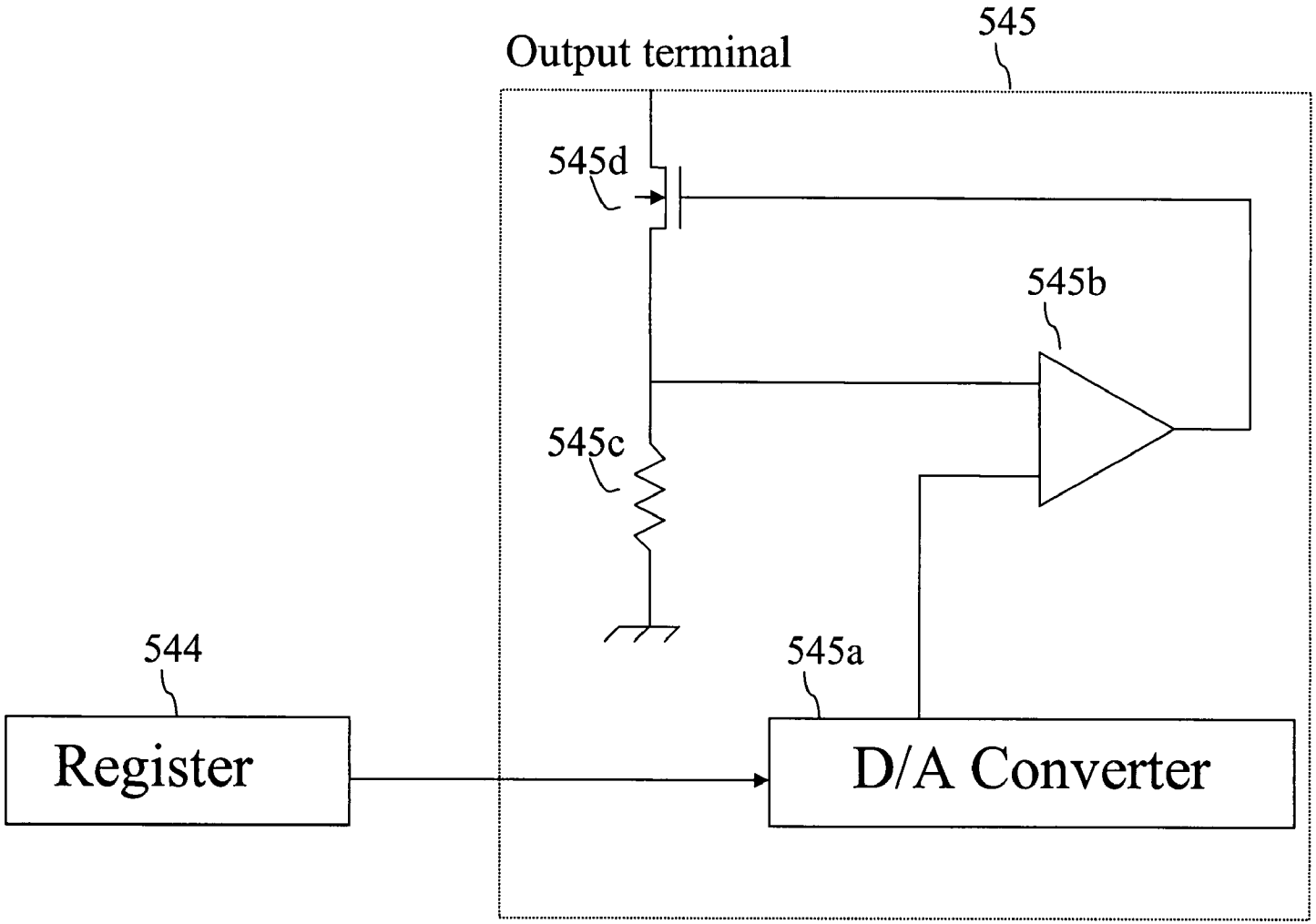
FIG. 16 a block diagram of a constant-current output circuit of the four-pin LED module.

When the synchronous LED lamp string has a large number of LED modules 50, the path of signal transmission and power line will be long, and line resistance will cause voltage or current loss. Thus the lamp string needs to be equipped with the function of constant current output to keep the brightness of all LED modules consistent. FIG. 16 a block diagram of a constant-current output circuit of the four-pin LED module. When the data in register 544 is locked, the data is converted into an analog signal via the digital-to-analog converter 545a and inputted to the input terminal of a signal amplifying circuit 545b. The other input terminal of the signal amplifying circuit 545b is connected to a voltage feedback resistor 545c, while the output terminal of the signal amplifying circuit 545b is connected to the gate of a MOS transistor 545d. The signal amplifying circuit 545b enables the light emitting diodes to produce brightness desired by the user through the adjustment of current passing through the MOS transistor 545d by the voltage feedback resistor 545c.

Figure 17A:
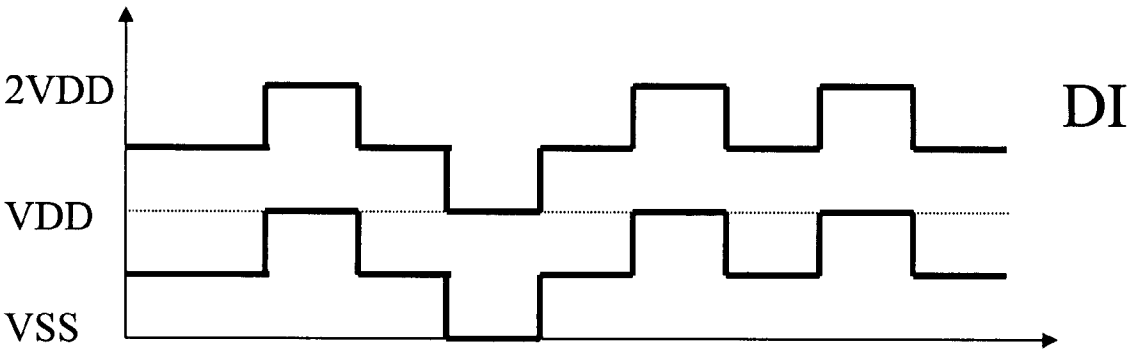
FIG. 17A and FIG. 17B are diagrams of serially inputted signal of the four-pin LED module.
Figure 17B:
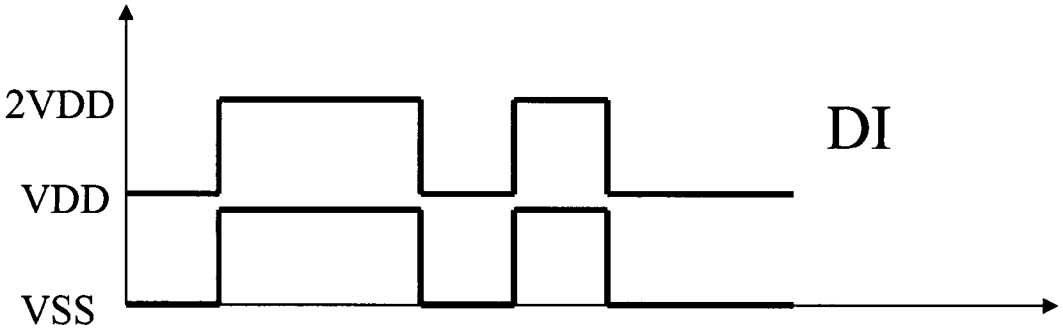

In the circuit block diagram shown in FIG. 14, the controller 54 of each LED module 50 has different power potential. As shown in FIG. 17A and FIG. 17B, the input signal and clock level of the previous-level LED module 50 is higher than the voltage level of controller 54 itself. Hence level shift and voltage biasing are necessary for the controller to receive the correct signal.

Figure 18:
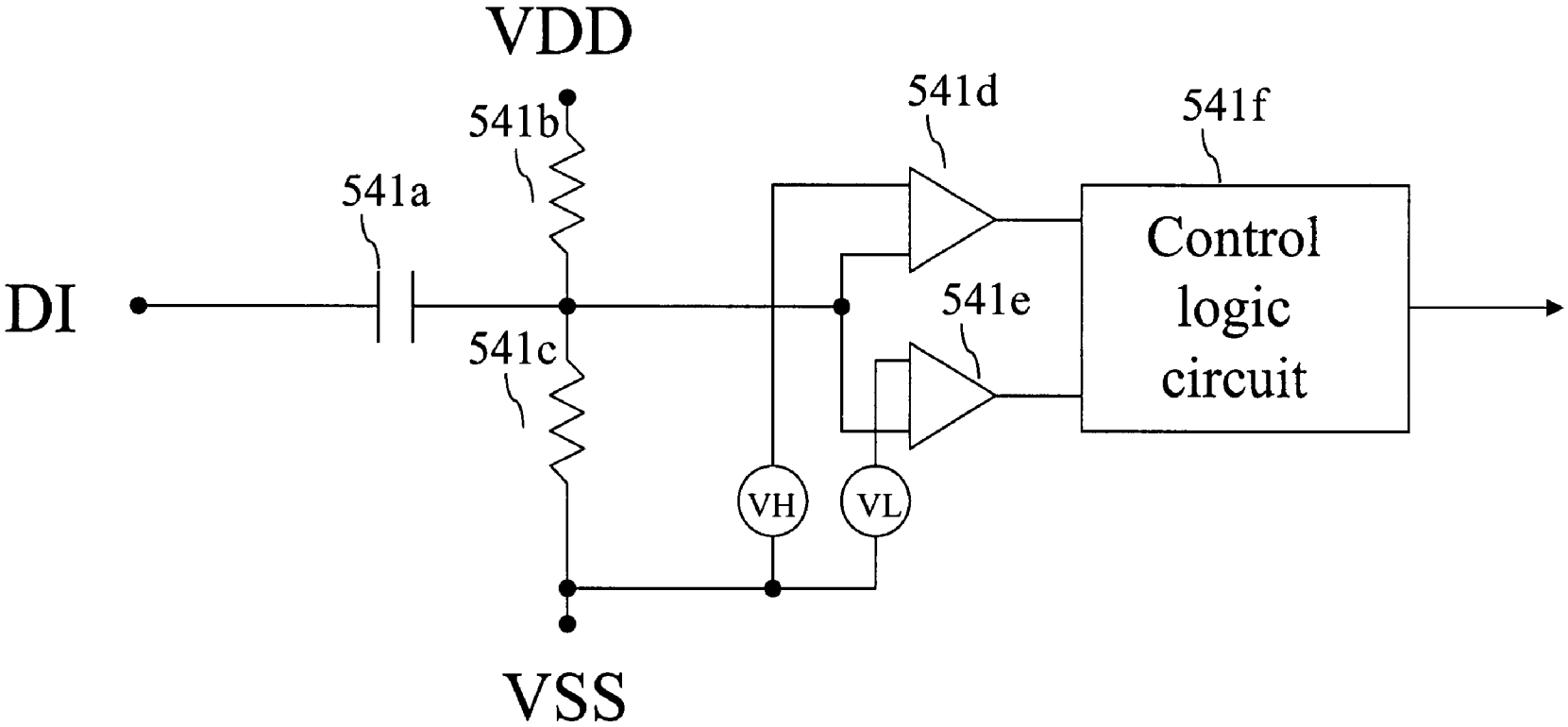
FIG. 18 is the input level shift and decoder circuit diagram of the four-pin LED module.

FIG. 18 is the input level shift and decoder circuit diagram of the recognition circuit 541 in LED module 50. When the output signal from the controller 54 of the previous-level LED module 50 is transmitted in, its voltage level is higher than the positive voltage of LED module 50. Thus a capacitor 541a is employed to filter the DC value of the inputted signal and resistors 541b, 542c are employed to bias the inputted signal within the working voltage of controller 54 (VSS-2VDD) as shown in FIG. 17A and FIG. 17B. Two voltage comparators 541d, 541e are respectively connected to a reference voltage level VH, VL (as shown in FIG. 15A) to compare the signal after biasing. Comparing the biased signal with VH and VL can obtain three states: higher than VH and VL, lower than VH and VL, or higher than VL but lower than VH. When the signal is higher than VH and VL, logic "1" is obtained; when signal is lower than VH and VL, logic "0" is obtained; when the signal is higher than VL but lower than VH, ½VDD is obtained. The clock is defined by the return of compared signal from logic "1" or logic "0" to ½VDD. Thus the circuit of LED module 50 can identify the signal level and transmission sequence, and transmits this correct signal to the control logic circuit 541f for processing, and then sends the processed signal to shift register 542 or encoder circuit 543.

Figure 19A:
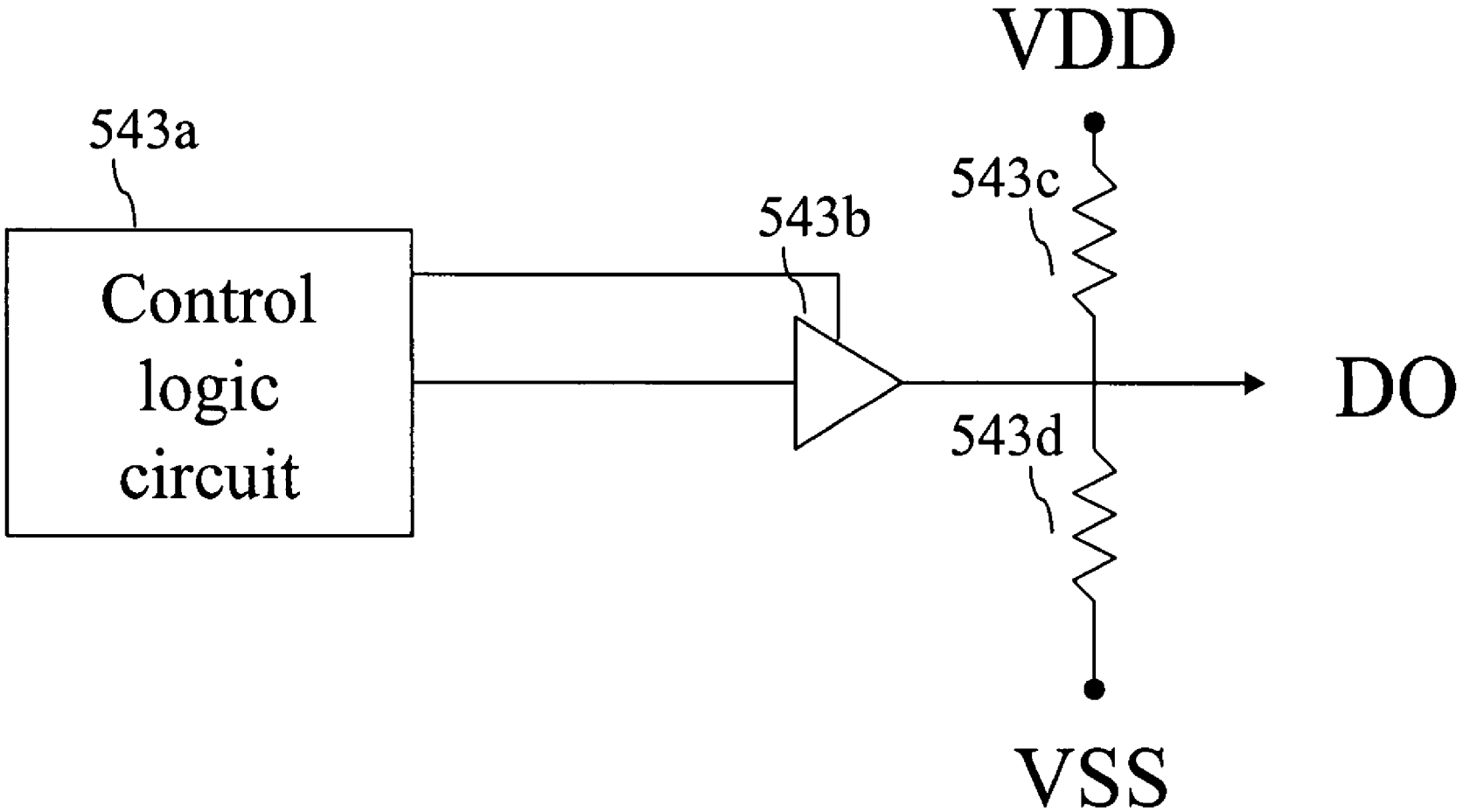
FIG. 19A, FIG. 19B and FIG. 19C are output encoding circuitries of the four-pin LED module.

FIG. 19A is an output encoder circuitry of the encoder circuit 543 of a four-pin LED module according to an embodiment of the invention, where data can be replicated for output via the output encoder circuit. As shown, the control logic circuit 543a contains the signal to be transmitted and the voltage signal clock for high and low potential. Through a third-state output buffer 543b and bias resistors 543c, 543d, when the signal "1" is to be output, the third-state output buffer 543b will output "1." Because the design is such that the output power of the third-state output buffer 543b is greater than the power of resistors 543c, 543d, the signal of output pin DO will be pulled to high potential "1" at this time. If signal "0" is to be output, the third-state output buffer 543b would simply output "0." To output a third-state signal, there will be no output from the third-state output buffer 543b. At this time, the signal of output pin DO will be in ½VDD state due to the bias of upper and lower resistors 543c, 543d. As such, the signal is replicated and transmitted to the next-level LED module 50.

Figure 19B:
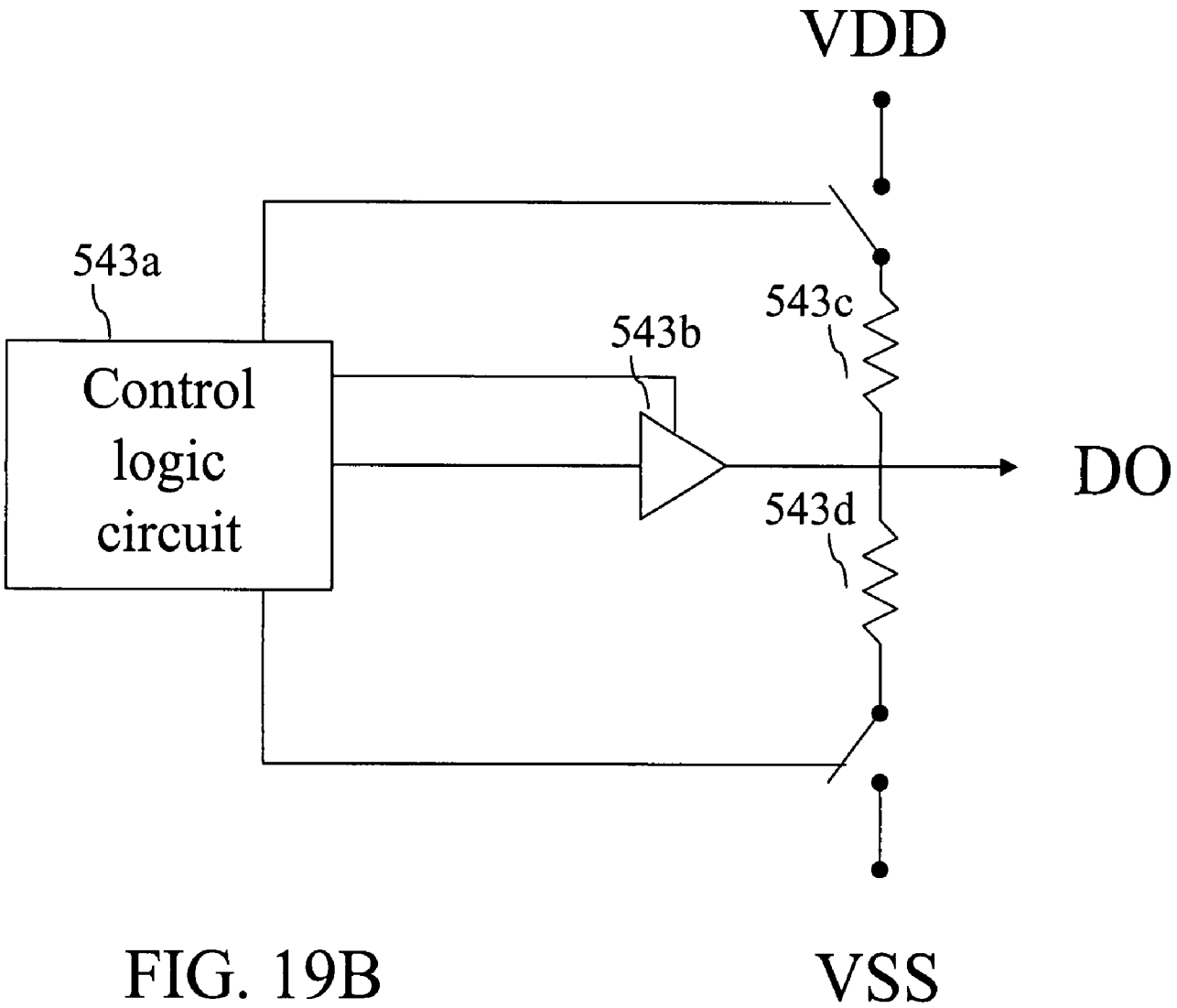

FIG. 19B is an output encoder circuitry of the encoder circuit 543 of a four-pin LED module according to another embodiment of the invention, in which, resistors 543c, 543d are respectively connected to VDD and VSS via a switch 543e, 543f. The control logic circuit 543a further controls switches 543e, 543f such that when there is no output from the third-state output buffer, it further controls the bias of upper and lower resistors 543c, 543d and changes the signal of output pin DO.

Figure 19C:
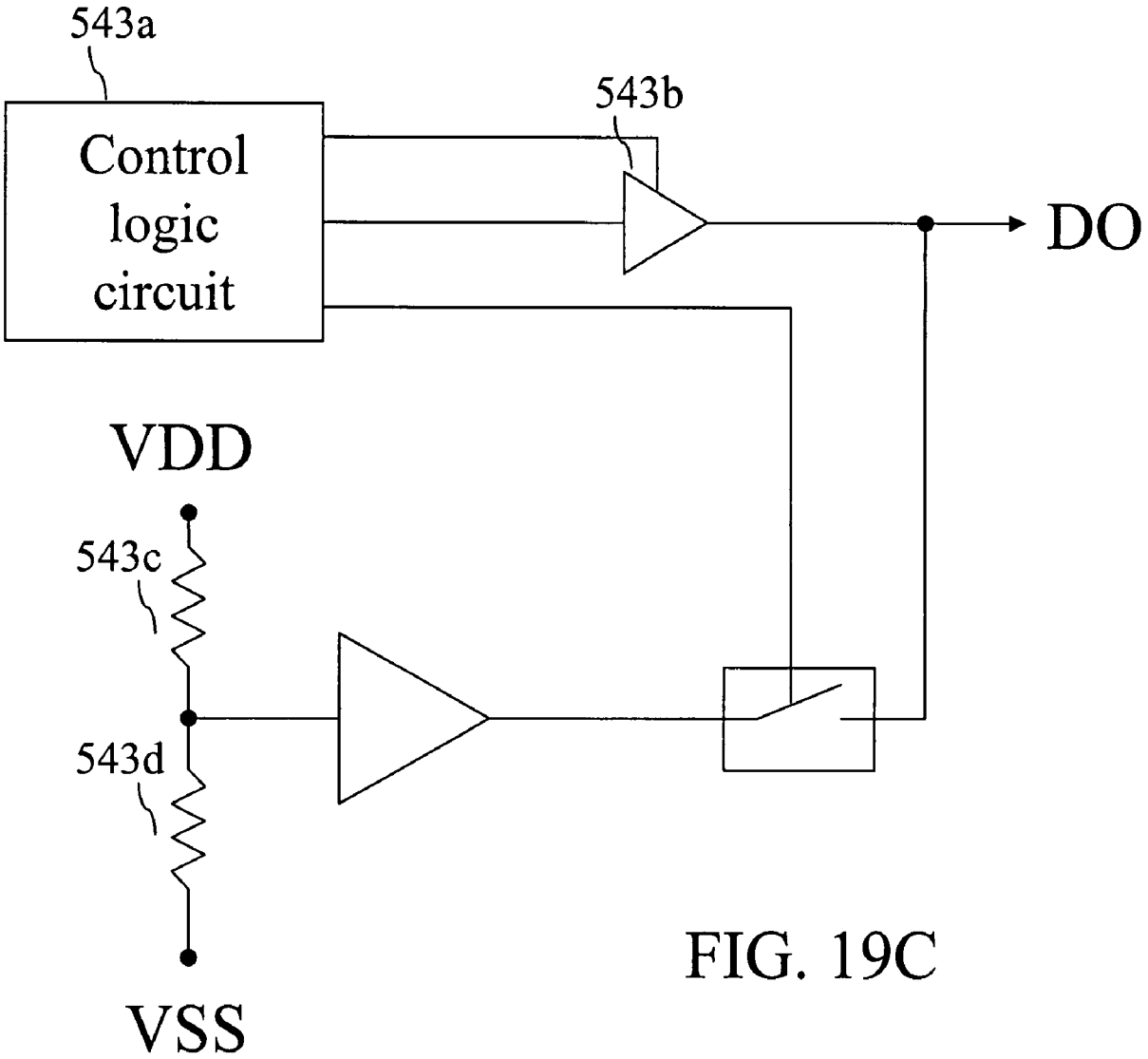

FIG. 19C is an output encoder circuitry of the encoder circuit 543 of a four-pin LED module according to another embodiment of the invention, in which, resistors 543c, 543d are respectively further connected to a bias buffer 543g and a switch 543h. The control logic circuit 543a further controls the switch 543h to select whether to output the bias of upper and lower resistors 543c, 543d from the bias buffer 543 so as to change the signal of output pin DO.

The preferred embodiments of the present invention have been fully illustrated. However the examples should not be construed as a limitation on the actual applicable scope of the invention, and as such, all modifications and alterations without departing from the spirits of the invention and appended claims shall remain within the protected scope and claims of the invention.

What is claimed is:

1. A synchronous LED lamp string controller, comprising a recognition circuit for receiving a reference signal with a constant frequency to carry out level shift and voltage biasing and output a recognition signal;

a shift register for receiving and storing the recognition signal;

an encoder circuit for receiving the data stored in the shift register and encoding and outputting said data;

a register for receiving and storing the complete data stored in the shift register; and a driver circuit for receiving the data stored in the register to drive at least a light emitting diode.

2. The synchronous LED lamp string controller according to claim 1, wherein the recognition circuit uses a capacitor to filter the direct current value of said reference signal and retain the alternate current value, uses a bias resistor to bias the filtered reference signal within the working voltage range of the synchronous LED lamp string controller, uses two voltage comparators each connected with a reference voltage level for comparison with the biased reference signal, and outputs a recognition signal representing the reference signal level being higher than the two reference voltage levels, lower than the two reference voltage levels, or lying between the two reference voltage levels.

3. The synchronous LED lamp string controller according to claim 1, wherein the encoder circuit has an output buffer and a bias resistor, the output power of the output buffer being higher than the output power of said bias resistor, the encoder circuit receiving the data stored in the shift register and outputting the same data via the output buffer, biasing the data output by the output buffer within the working voltage range of the synchronous LED lamp string controller via the bias resistor, and outputting the biased data.

4. A synchronous LED lamp string controller, comprising a first control logic circuit coupled to a data input pin; and a second control logic circuit coupled to a data output pin;

wherein data logic H *of a data signal* in one bit transmitted *with a clock signal* by the data input pin and the data output pin is represented by a first voltage level with a predefined time interval and a second voltage level thereafter in one bit, data logic L *of the data signal* in one bit transmitted *with the clock signal* by the data input pin and the data output pin is represented by a third voltage level with the predefined time interval and the second voltage level thereafter in one bit, the second voltage level is between the first voltage level and the third voltage level; and wherein *the data signal and the clock signal are simultaneously transmitted from* the data input pin [and] *to* the output pin [transmitted data with the same clock].

5. A synchronous LED lamp string controller, comprising a first control logic circuit coupled to a data input pin; and a second control logic circuit coupled to a data output pin;

wherein data logic H *of a data signal* in one bit transmitted *with a clock signal* by the data input pin and the data output pin is represented by a first voltage level with a predefined time interval and a second voltage level thereafter in one bit, data logic L *of the data signal* in one bit transmitted *with the clock signal* by the data input pin and the data output pin is represented by a first voltage level with a second predefined time interval and the second voltage level thereafter in one bit; and wherein *the data signal and the clock signal are simultaneously transmitted from* the data input pin [and] *to* the output pin[transmit data with the same clock].

* * * * *